(12) United States Patent
Spellman et al.

(10) Patent No.: US 6,982,383 B1
(45) Date of Patent: Jan. 3, 2006

(54) OUTER CASING STRUCTURE AND FABRICATION METHOD FOR CABLE SECTIONS AND NAVY BUOYANT ANTENNAS

(75) Inventors: Charles D. Spellman, Rocky Hill, CT (US); Edward H. Dzwilewski, Niantic, CT (US); Thomas S. Ramotowski, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/631,221

(22) Filed: Jul. 30, 2003

(51) Int. Cl.
*H02G 15/02* (2006.01)

(52) U.S. Cl. .................. 174/74 R; 174/80
(58) Field of Classification Search .......... 174/36, 174/110 R, 113 R, 120 R, 74 R, 75 R, 75 D, 174/75 C, 76, 77 R, 80, 84 R; 367/16, 17, 367/20, 18, 154, 191
See application file for complete search history.

(56) References Cited

U.S. PATENT DOCUMENTS

| | | | | |
|---|---|---|---|---|
| 3,480,907 A | * | 11/1969 | King ..................... 367/154 |
| 4,463,358 A | * | 7/1984 | Phillips ................... 343/709 |
| 4,510,588 A | * | 4/1985 | Kruka et al. ............. 367/165 |
| 4,659,253 A | * | 4/1987 | Jacobson ................. 405/171 |
| 4,685,090 A | * | 8/1987 | Krevor .................... 367/20 |
| 5,396,859 A | * | 3/1995 | Hillenbrand et al. ...... 114/312 |
| 5,417,006 A | * | 5/1995 | Schettino ................. 43/17.1 |
| 5,606,329 A | * | 2/1997 | Ramotowski et al. ..... 343/709 |
| 5,745,436 A | * | 4/1998 | Bittleston ................. 367/20 |
| 6,154,420 A | * | 11/2000 | Norris ..................... 367/16 |

* cited by examiner

*Primary Examiner*—William H. Mayo, III
(74) *Attorney, Agent, or Firm*—James M. Kasischke

(57) ABSTRACT

The present invention relates to a cable section assembly for marine applications having a core structure, such as a buoyant cable antenna interim manufacturing step subassembly, and a protective casing formed from a heat shrinkable tubing which together with the interim subassembly forms a complete assembly. For buoyant cable assembly applications the interim subassembly is at least partially formed of polyurethane material having glass microballoons distributed therein, with such material in any event occupying an outer layer portion of the subassembly. The cable section assembly of the present invention is formed by providing a length of heat shrinkable flexible tubing, inflating or expanding the heat shrinkable tubing to its approximate full diameter, inserting the core structure into the length of tubing, and shrinking the tubing around the core structure.

4 Claims, 1 Drawing Sheet

OUTER CASING STRUCTURE AND FABRICATION METHOD FOR CABLE SECTIONS AND NAVY BUOYANT ANTENNAS

STATEMENT OF GOVERNMENT INTEREST

The present invention may be made or used on behalf of or for the Government of the United States of America without the payment of royalties thereon or therefor.

CROSS REFERENCE TO RELATED PATENT APPLICATION

This application is related to one co-patent application entitled STRENGTH STRAND CONSTRUCTION FOR A LONGITUDINAL SECTION OF A CABLE, filed on an even date herewith. This co-pending application hereby incorporated herein by reference in their entirety.

BACKGROUND OF THE INVENTION (1) Field of the Invention

The present invention relates to an improved cable section assembly including a core structure and a protective outer casing for marine applications and a method for forming said cable assembly. The invention is of utility in connection with such assemblies employ by the U.S. Navy as buoyant antenna sections. An example of a cable section and antenna component is disclosed in U.S. Pat. No. 6,426,464, issued 30 Jul. 2002, which is hereby incorporated by reference in its entirety. An example of a composition of material for the core structure which provides buoyancy is disclosed in U.S. Pat. No. 5,606,329 issued 29 Feb. 1997, also hereby incorporated by reference in its entirety.

(2) Description of the Prior Art

Cables have been used for a wide variety of marine purposes. U.S. Pat. No. 3,434,104 to Stapleton et al., for example, illustrates a hydrophone cable constructed of a plurality of sections which are so constructed and arranged as to provide protection to the sensing devices carried thereby. The cable includes a body of cellular material, such as foamed polyurethane, provided with cavities in its exterior surface, in which crystal detectors are recessed. The cable further includes a waterproof jacket enclosing the cellular material body. A floatation liquid is contained in a space between the outer jacket and the body. Further, strain members and electrical conducting wires are enclosed within the body.

U.S. Pat. No. 3,480,907 to King illustrates a neutrally buoyant hydrophone streamer in which solid polymeric material, having a plurality of discrete air-filled particles distributed throughout, fills all remaining space within a hollow jacket.

U.S. Pat. No. 3,744,016 to Davis describes a buoyant seismic streamer housing cable and its electronics. A syntactic foam is molded about the cable/electronics. An abrasion resistant sheathing encases the syntactic foam.

U.S. Pat. No. 3,900,543 to Davis describes yet another neutrally buoyant seismic hydrophone streamer. The streamer is constructed by extruding a syntactic foam material comprising an elastomeric material and gas filled microspheres onto a central stress member to form an elongated streamer member. The streamer is then covered with a water and oil resistant, abrasion resistant covering. It may be provided with exteriorly affixed hydrophones or hydrophones that can be affixed to the foam core. An outer protective sheath can be extruded or otherwise provided around the streamer and the hydrophones. Extrusion is effected utilizing a suitable elastoplastic material which can be extruded at pressures below about 300 psi.

U.S. Pat. No. 4,733,379 to Lapetina et al. illustrates a flexible line array assembly which includes an array of spaced-apart piezoelectric elements arranged in a line. Electrodes are disposed on the opposing surface areas of the elements and are coupled to conductors which carry signals produced by the piezoelectric elements when the elements are stressed by acoustical signals. A porous, open-cell material is disposed about the piezoelectric elements as an encasement to maintain the elements in place and mechanically isolate the elements. An outer, water-tight jacket encloses the open cell material and holds a fill fluid carried within the open-cell material. An electrically conductive flexible sleeve is placed either about the open-cell material or about the outer jacket to shield the piezoelectric elements from electromagnetic waves.

U.S. Pat. No. 4,963,420 to Jarrin et al. describes a buoyant cable assembly which uses a polyethylene material to separate tubes or cables and a thermoplastic material as an external sheath. An extrusion process is used to form the cable.

In the late 1980s, a new capability was conceived for a buoyant cable antenna (BCA) which would extend its frequency range. A requirement of this new system was that the electronic circuit boards be distributed throughout a section of the BCA. Thus, the previously used amplifier chassis could no longer be used.

Current BCAs are made of polyethylene. Because polyethylene requires high heat in the molding process, it has been dismissed as a molding material for fear that the electronics would be damaged by the extreme heat. Thus, a room temperature curing compound, polyurethane, has been selected as the molding compound.

The potted circuit boards used in the BCAs have to withstand the flexing that the BCA assembly undergoes while deployed at sea. To accomplish this, the circuit boards are potted in a polyurethane that exhibits a high durometer reading. The areas between the molded circuit boards are then overmolded with a microballoon filled polyurethane compound to provide buoyancy.

After fabricating and testing a few of these BCA assemblies, it became apparent that the buoyant polyurethane compound was not durable enough to withstand the deployment process. The compound could be over-flexed during handling, causing cracks and breaks to occur. When deployed using a standard Navy capstan, the assembly was easily gouged and its integrity was frequently compromised. After only a few deployments, the test assemblies quickly deteriorated to the point where they were torn apart by the capstan mechanism. In addition, the possibility that the polyurethane compound would become saturated with water during testing at pressure and thereby exhibit different mechanical properties and possibly a decrease in buoyancy, was also of serious concern.

Thus, there remained a need for a rugged cable assembly which can withstand the rigors of deployment and handling.

SUMMARY OF THE INVENTION

Therefore, it is an object of the present invention to provide a cable assembly for marine applications having increased stiffness which reduces the possibility of it being accidentally overflexed.

It is a further object of the present invention to provide a cable assembly as above having a covering which is resistant to nicks and cuts.

It is still a further object of the present invention to provide a cable assembly as above which can be used as a buoyant cable antenna.

It is yet a further object of the present invention to provide an improved method for manufacturing a cable assembly such as a buoyant cable antenna.

The foregoing objects are attained by the cable assembly and the method of the present invention.

A cable assembly in accordance with the present invention broadly comprises a core structure, such as in a buoyant cable antenna, surrounded by a covering formed from a flexible, heat shrinkable tubing. The heat shrinkable tubing covering may be formed from a polyolefin or fluoropolymer heat shrinkable material. It has been found that such a covering provides stiffness to the cable assembly as well as a tough skin which is needed so that the cable assembly is not damaged during handling and deployment through a capstan mechanism. The core structure, in a preferred buoyant cable antenna construction, includes a flexible conduit for housing electrical wires and/or electrical components, which conduit has overmolded thereabout an outer layer of syntactic foam material formed by a polyurethane material having glass microballoons distributed therein.

The method of manufacturing the cable assembly of the present invention broadly comprises providing a length of heat shrinkable tubing, inflating or expanding the tubing to its approximate full diameter, inserting the core structure into the expanded or inflated tubing, and shrinking the tubing around the core structure.

Other details of the cable assembly and the method of manufacturing the cable assembly, as well as other objects and advantages attendant thereto, are set forth in the following description and the accompanying drawings.

DESCRIPTION OF THE PREFERRED EMBODIMENT(S)

Figure 1:
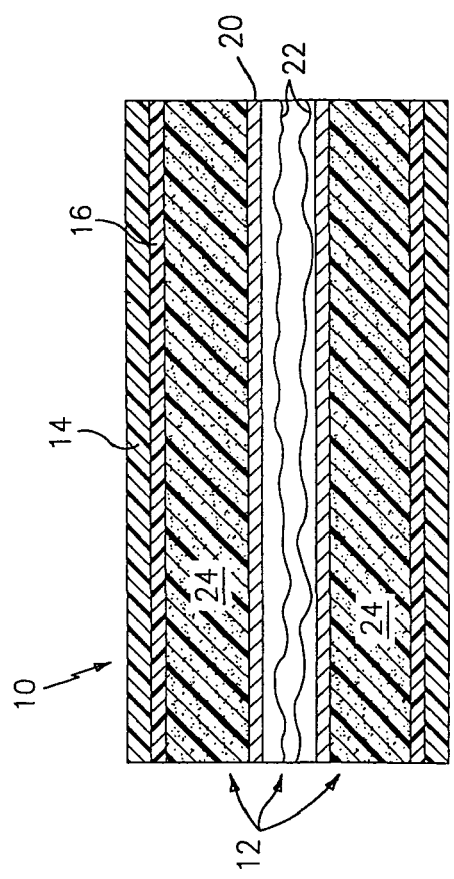
FIG. 1 illustrates a sectional view of a mid-portion of a linear section of a flexible cable assembly which encompasses electric wires and in accordance with the present invention.

Referring to the drawings, FIG. 1 illustrates a longitudinal cable section assembly 10 in accordance with the present invention. The cable section assembly 10 includes a core structure 12, such as a flexible, positively buoyant cable antenna interim manufacturing step subassembly produced before application of a protective casing. In cases of intended use of the cable section as a buoyant cable section in a marine environment, an effective material from which to mold outer layer 24 is the thermosetting polymer curable at room temperature loaded with glass microballons in a range of about 15 percent to about 20 percent by weight of the microballoons, as disclosed in U.S. Pat. No. 5,606,329 to J. Ramstowski and J. Monahan, entitled "Buoyant Cable Antenna", which is hereby incorporated herein in its entirety. The flexible, positively buoyant antenna interim manufacturing step subassembly forming the core structure 12 may comprise any suitable construction known in the art, including constructions incorporating electronic printed wiring board strips and including constructions in which the exterior of the core structure is in the form of an arrangement of surface segments formed from a series of separate molded parts. FIG. 1 illustrates one such buoyant cable antenna structure having a narrow flexible tubing conduit 20 through which a plurality of electrical wires 22 pass and an overmolded outer annularly cross-sectioned outer layer portion 24 of polyurethane material having glass microballoons or microspheres distributed throughout, or other form of syntactic foam. The conduit 20 may be formed from any suitable flexible material. The wires 22 may be used to connect various electrical elements (not shown) such as circuit boards used in the antenna. These various electrical elements, as for example circuit board strips, may be housed in the conduit 20 or may be external to the conduit and/or the cable. For example, the electrical elements may be encapsulated or molded into the outer layer portion 24.

A covering or casing 14 surrounds the core structure 12. The purpose of the covering 14 is to provide stiffness to the cable assembly 10 as well as a tough outer skin for preventing damage to the core structure 12 so that it is not damaged during handling and deployment through a capstan mechanism such as the submarine borne AN/BRA-24 mechanism for deploying the buoyant cable antenna. In a preferred cable construction, the covering 14 is formed by a flexible, thermoplastic heat shrinkable tubing formed from a polyolefin or fluoropolymer material. It is to be appreciated that in addition to the described cross-sectional construction each buoyant cable antenna assembly is in the form of a linear section of cable. The length of the linear section is determined by such factors as the length of a practical clamshell molding apparatus to perform overmolding of the syntactic foam outer layer portion 24 upon a conduit 20, and/or the distance over which any electronic components incorporated into the cable need to be distributed. In one illustrative embodiment the length of a section was approximately 10 to 12 feet in length with a diameter of 0.65 inches.

The cable assembly 10, in a preferred embodiment, further includes a layer 16 of an adhesive material between the core structure 12 and the covering 14. It has been found that the adhesive material layer 16 is particularly helpful in preventing wrinkling of the covering 14. Further in using thermoplastic heat shrinkable tubing 14 with a layer of heat activated thermoplastic adhesive material therebetween, it is preferred that the wall thickness of tubing 14 be sufficient thickness to exert enough constrictive forces upon the adhesive layer in the course of heat shrinking to cause the exterior of section assembly 10 to be uniformity formed throughout its length. For the case of cable assemblies having outer diameters in the range between 0.5 and 0.75 inches, such minimum thickness of the tubing wall for achieving a uniformity formed assembly exterior is about $\frac{1}{16}^{th}$ of an inch. In a preferred construction of the cable assembly of the present invention, the adhesive material used for the layer 16 comprises a heat activated thermoplastic adhesive in tape form, such as TTS-250 Hot Melt Tape manufactured by 3M Company of St. Paul, Minn., which adhesive material is rubbery, but not tacky/sticky at room temperature. When the cable assembly of the present invention is fabricated, the tape form of adhesive is preferably hand-wrapped around the outside of the core structure 12 with a small overlap on each preceding wrap around the girth of the core structure. When later heated, the adhesive melts and flows. It resolidifies as it cools.

The cable assembly 10 is manufactured by providing a core structure 12 and wrapping adhesive material around the core structure to form the adhesive material layer 16. Thereafter, a desired length of the heat shrinkable tubing, forming the covering 14, is inflated using compressed air to open the tubing to approximately its full diameter. The compressed air is preferably flowed into one end of the length of shrink tubing by means of a gun-type dispenser (not shown) attached to a rubber hose (not shown) which is attached to a compressed air regulator/outlet (not shown). Suitable means (not shown) may be provided to hold the shrink tubing so that it does not blow off the end of the dispenser.

Figure 2:
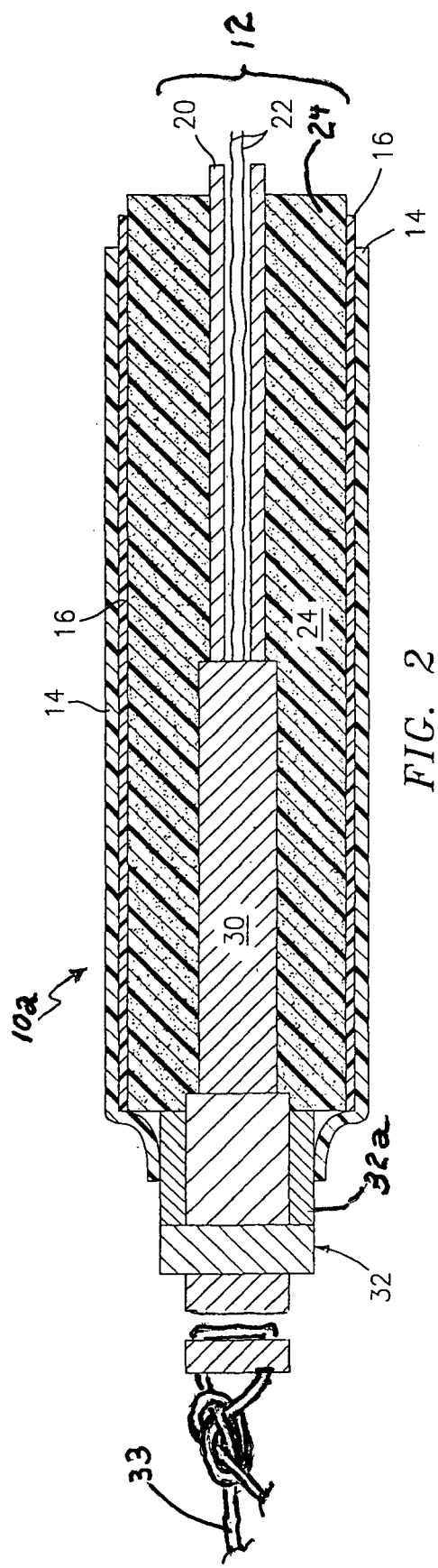
FIG. 2 is in part a sectional view and in part a diagrammatic view of an end of a cable section assembly showing a mechanical grip structure useful in the process of inserting a core structure into flexible heat shrinkable tubing during the manufacturing process for applying the outer protective casing to the assembly.

While the tubing is dilated to its approximate full diameter, the core structure 12 with the wrapped adhesive material layer 16 is introduced into the heat shrinkable tubing 14 through the dilated opening of the tubing which is opposite to the end receiving the flow of compressed air (or other gaseous medium). Referring now to FIG. 2, a cable section assembly normally has cable-end grip devices 32 affixed at the ends of its core structure. The function of the devices 32 is to provide mechanical and transmission line coupling with adjoining cable sections. By way of a short explanation device 32 include a cylindrical Chinese finger toy type open-mesh-sleeve shown diagrammically as element 32, which is jammed around a cylindrical grip foundation collar 30 formed about a marginal end portion of conduit 20. Using device 32 as a structure for the attachment of a pull string 33, core structure 12 is pulled through the inflated and dilated tubing 14.

The other end of line 33 is threaded through the bore of tubing 14 with a purchase end linear portion of the line (not shown) projecting, and accessible to be pulled from the end of the tubing which receives the flow of compressed air. As air is flowed through tubing 14 the purchase end of line 33 is pulled to more core structure into a final position for heat shrinking the tubing thereonto.

After the core structure 12 with the adhesive material layer 16 is in its final inserted position within the heat shrinkable tubing 14, hot air guns may be used to shrink the tubing 14 down to the outer dimension of the adhesive material layer 16. During this shrinking operation, sufficient heat should be applied to the adhesive material layer 16 to melt the adhesive material and cause it to flow. As a result, an excellent bond between the core structure 12 and the covering 14 is formed. While the chemistry of the reaction which provides such an excellent bond is not fully understood, it is believed that it is due to an inherent affinity of the surfaces of polyolefin or fluoropolymer material and surfaces of polymer-based materials to moldingly bond.

The hot air guns used in the method of the present invention may comprise any standard, commercial "off the shelf" hot air gun. For example, a Raychem model CV-5300 hot air gun or a Master-Mite model 10008 heat gun may be used. Some hot air guns come with a special metal attachment for their nozzles to help process shrink tubing. The attachment has a curved lip which is designed to help shrink the tubing uniformly without having to change the position of the hot air gun or the item around which the shrink tubing is being shrunk. This attachment speeds up the shrinking process somewhat, but does not have to be used.

One of the advantages to using shrink tubing in the manner described above is that the core structure, such as the buoyant cable antenna, may be completely constructed and molded prior to being encased in a protective coating. It eliminates any need to cast and inject very viscous microsphere-loaded polyurethane into a narrow cavity. It also gives the final cable structure a smooth, homogeneous outer surface with no vulnerable soft areas to be gouged out by the deployment mechanism.

Another advantage to the manufacturing method of the present invention is that it does not involve the use of any hazardous materials. Further, the manufacturing method does not produce any structural property of the cable which would interfere with the emission or reception of the electromagnetic radiation of interest to an antenna.

While the core structure 12 has been described as being a buoyant cable antenna, the covering 14 of the present invention may be used to protect other types of core structures such as a particulate loaded polymer casting of regular shape to be used in a marine environment. In fact, the covering 14 of the present invention can be applied to any object in need of a relatively thin, flexible, protective and water-tight covering regardless of the length of the object to be encased.

It is apparent that there has been provided in accordance with the present invention a Protective Sheath For Microballoon Molded Cables which fully satisfies the means, objects and advantages set forth hereinbefore. While the invention has been described in relation to cable core structures whose outer portions are formed of molded plastic-based materials, it is to be understood that the disclosed concepts and teachings also have applicability to buoyancy providing cable core structures using cellular and foamed materials. Further, it is evident that many alternatives, modifications, and variations will be apparent to those skilled in the art in light of the foregoing description. Accordingly, it is intended to embrace all such alternatives, modifications, and variations as fall within the broad scope of the appended claims.

What is claimed is:

1. A cable section assembly of a type having a range of outer diameter between about 0.5 and 0.75 inches and whose length is limited by the size of practical clamshell overmolding apparatus, said cable section assembly comprising:
   a core structure;
   a casing for adding stiffness to the cable and for preventing damage to said core structure during handling and deployment, said casing surrounding said core structure and being formed from a thermoplastic heat shrinkable tubing;
   said core structure being of the type whose outer surface which presents itself to the bore surface of said heat shrinkable tubing is formed of at least one longitudinally extending member made of molded polyurethane-based material;
   a layer of thermoplastic adhesive material between said core and said casing, said adhesive material bonding said core structure with said casing;
   said thermoplastic heat shrinkable tubing has a predetermined tube wall thickness so chosen to adapt the tubing to exert sufficient constrictive forces upon said adhesive layer to cause the exterior of the assembly to be uniformally formed throughout its length; and
   said predetermined thickness is about 1/16th of an inch.

2. The cable section assembly of claim 1, wherein said heat shrinkable tubing is formed from a material selected from the group consisting of polyolefin and fluoropolymer.

3. The cable section assembly of claim 1, wherein the outer surface of the core and the bore of the heat shrinkable tubing each have concentric cylindrical shapes, and:
   said layer of thermoplastic material being in a form of heat meltable tape spirally wrapped around said core structure with overlap between each successive wrap around the core structure's girth.

4. The cable assembly of claim 1, further comprising:

said core structure including a central flexible conduit and at least one linearly extending energy transmission medium extending through the conduit; and said at least one energy transmission medium being selected from the group of transmission media consisting of an electric wire, a microwave coaxial cable, and a fiber optic line.

* * * * *